Nov. 10, 1953
L. W. KOUTNIK
2,658,250
SLIDE FASTENER OF THE EXTRUDED TYPE
Filed Dec. 13, 1952
2 Sheets-Sheet 2
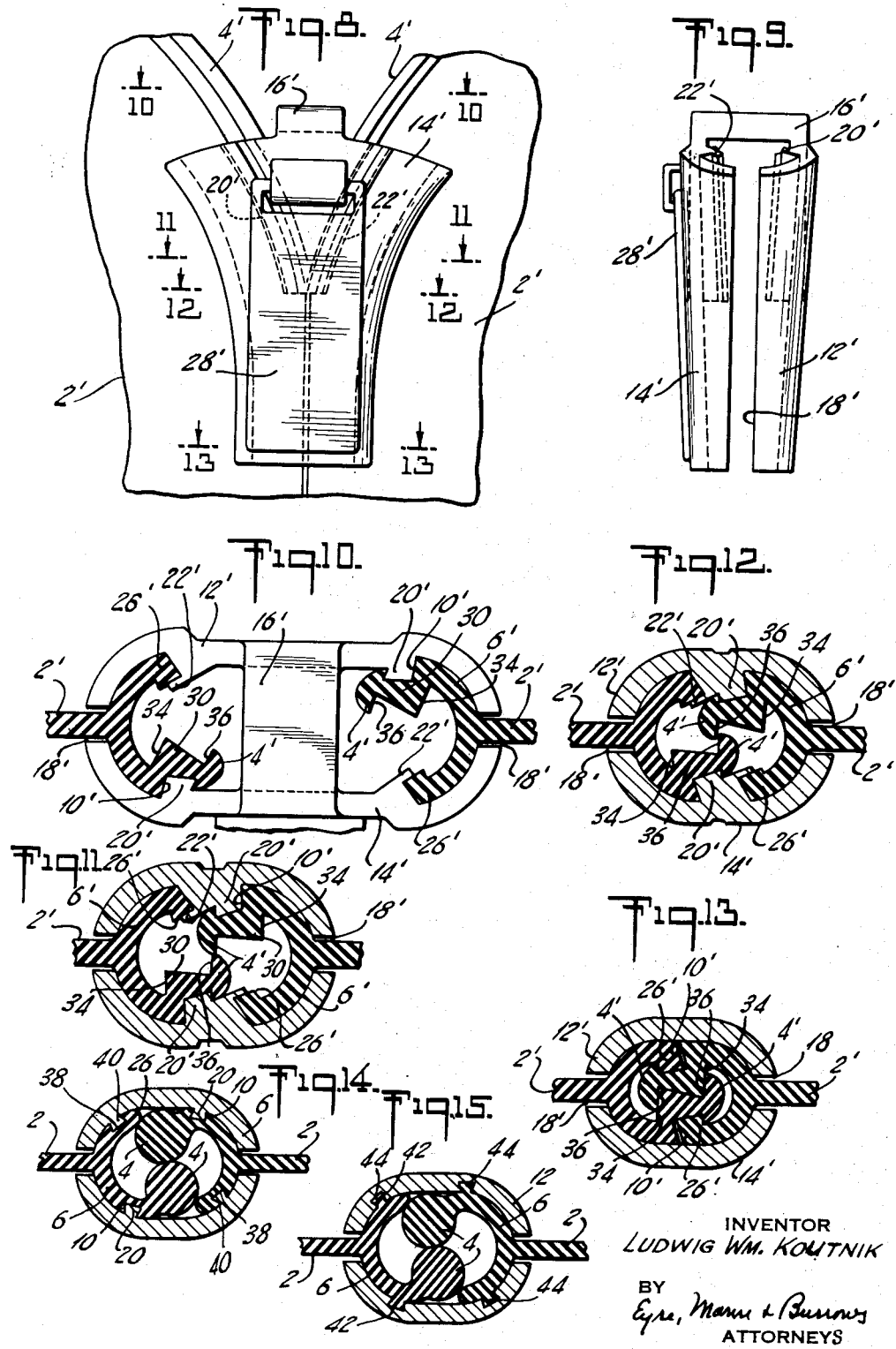
INVENTOR
LUDWIG WM. KOUTNIK
BY
Eyre, Mann & Burrows
ATTORNEYS Patented Nov. 10, 1953

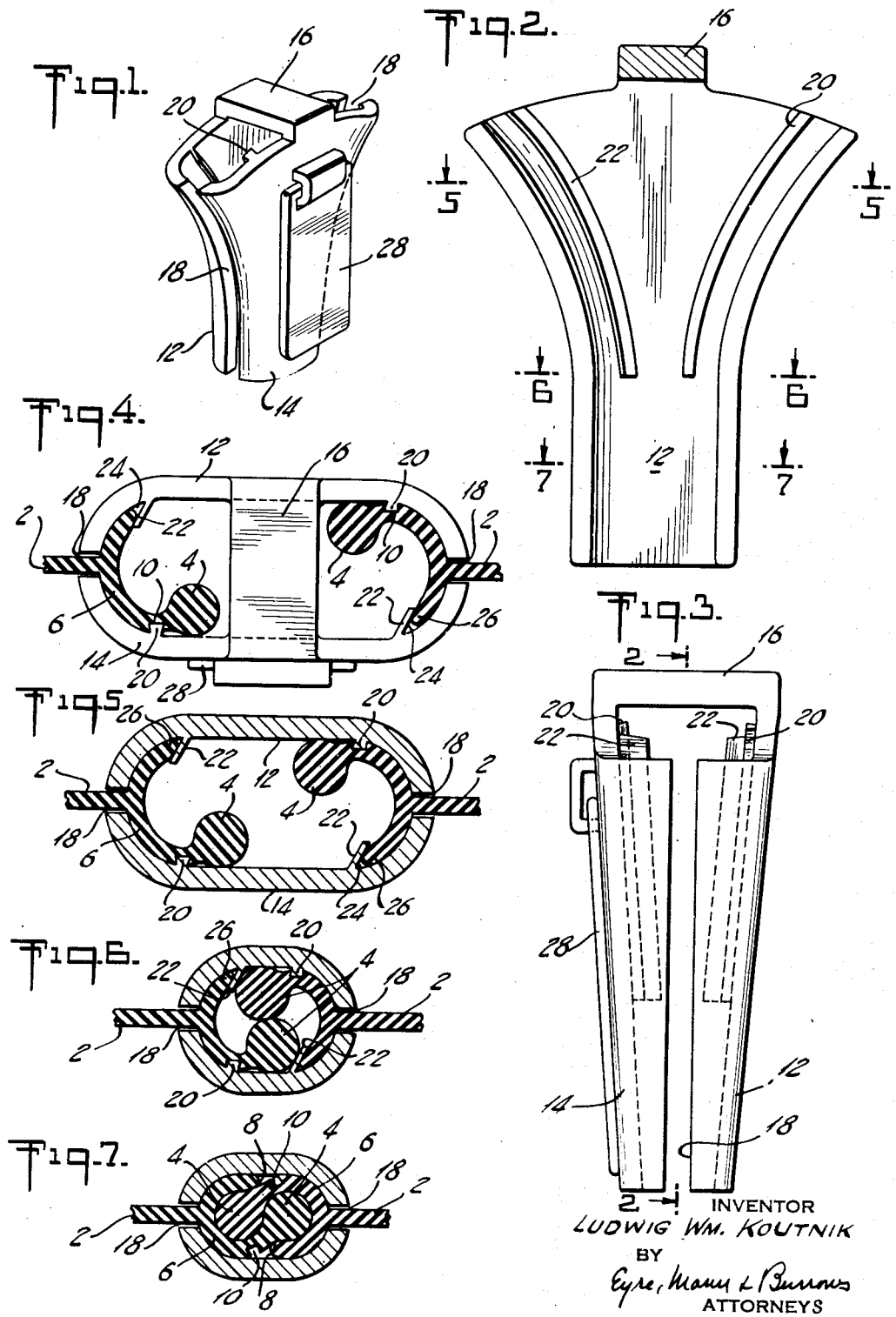

2,658,250

UNITED STATES PATENT OFFICE 2,658,250

SLIDE FASTENER OF THE EXTRUDED TYPE

Ludwig W. Koutnik, West Babylon, N. Y., assignor to Frank S. Brainard, Jr., Hartford, Conn.

Application December 13, 1952, Serial No. 325,814

6 Claims. (Cl. 24—201)

The present invention relates to slide fasteners of the type wherein strips of relatively resilient and flexible material are formed with parts adapted to interlock and hold the strips in edgewise relation. The present invention is more particularly concerned with an improved slider for locking and unlocking fasteners of the above general type. Various types of fasteners made of rubber or of organic plastic have been proposed in the patent art and the advantages of such type of fastener over the metal type of slide fastener have been appreciated. Commercially, however, these fasteners have not been successful for the reason that no efficient slider for operating such type fastener has heretofore been known. Prior art sliders have parts which engage the interlocking surfaces of the relatively pliant material of the fastener to force these surfaces apart during the opening operation. Friction between the slider and the fastener has caused excessive wear or distortion of the locking parts of the fastener with the result that the parts of the fastener either fail to lock properly after a short time or the slider jams and ceases to function. The only fastener of this general type which has as yet been commercially successful has been one wherein the fastener is brought into locking engagement by superposing one part over the other and this for the reason that in such fastener a slider can be dispensed with. For certain articles, as for example tobacco pouches, brief cases and the like, no particular disadvantage results if it is necessary to overlap the parts when closing the fastener. In other applications, however, as for example for wearing apparel or the like, a fastener which can be locked by bringing the parts together edgewise rather than by superposition of the parts, is preferable and it is with this type of fastener that the new slider is designed to operate.

In general, fasteners of the type with which the slider of the invention cooperates, comprise a rib along one edge adapted to fit into a corresponding channel formed adjacent the edge of the other member. Ordinarily, each member is formed with both a rib and a channel so that when the fastener is manufactured a single continuous strip may be cut into two lengths to form the two members of the fastener. Thus if the strip is formed by extrusion a single die only is needed for both parts of the fastener. The slider of the present invention has little, if any, contact with the actual gripping surfaces of the fastener and therefore does not cause wear on these surfaces. The slider provides means engageable with the outer surface of each of the members for spreading the channel walls thereof while drawing the members together for insertion of the ribs into the channels, the slider gradually bringing the members toward each other in edgewise direction and then releasing the channel walls after insertion of the ribs into the channels. The new slider is adapted for use with fasteners of various configuration, whether of the type wherein each member includes both a rib and a channel or with the type wherein one member includes a rib and the other a channel.

For a better understanding of the invention and of constructions embodying the same, reference may be had to the accompanying drawings, in which—

Fig. 1 is an isometric view of a slider constructed according to the invention and shaped for cooperation with a fastener wherein the interlocking members are of identical form and each comprises a cylindrical male element and a tubular female element;

Fig. 2 is an enlarged vertical section through the slider of Fig. 1 and taken on the line 2—2 of Fig. 3;

Fig. 3 is a side view of the slider of Fig. 1;

Fig. 4 is a top view of the slider of Fig. 1 shown mounted on fastener members to be brought into locking engagement;

Fig. 5 is a sectional view taken on the line 5—5 of Fig. 2 but showing fastener members within the slider;

Fig. 6 is a view similar to Fig. 5 but taken on the line 6—6 of Fig. 2;

Fig. 7 is a view corresponding to Figs. 5 and 6 but taken on the line 7—7 of Fig. 2;

Fig. 8 is a plan view of another slider embodying the invention shown mounted on fastener members to be brought into locking engagement;

Fig. 9 is a side view of the slider of Fig. 8;

Fig. 10 is a top view of the slider and fastener of Fig. 8 taken on the line 10—10 of that figure;

Figs. 11, 12 and 13 are sectional views taken on the lines 11—11, 12—12 and 13—13, respectively, of Fig. 8; and Figs. 14 and 15 are sectional views corresponding to Fig. 6 but representing alternative constructions of slider.

Referring first to the embodiment of the invention illustrated in Figs. 1 to 7 wherein a slider is shown that is adapted for locking and unlocking a prior art fastener comprising a pair of strips 2 of resilient material adapted to interlock along their edges. Each of these strips has a solid cylindrical front edge portion 4 and a tubular portion 6 located rearwards of the front edge portion and complementary to the cylindrical portion 4. The tubular portions 6 have side openings 8 through which the cylindrical portions 4 engage the tubular portions. In order to operate this fastener by the new slider, dovetailed grooves 10 are formed in the outer surface of the tubular portions 6 adjacent the cylindrical portions 4. These grooves cooperate with ribs on the slider now to be described.

The slider comprises two rigid walls 12 and 14 of metal or the like interconnected at one end by a cross piece 16 and providing open ended slots 18 at each side for accommodation of the strips 2 of the fastener. The walls 12 and 14 of the slider are so shaped that the spacing therebetween adjacent the crosspiece 16 is greater than at the open end of the slider. The overall width of the parts 12 and 14 is substantially uniform for a short distance from the open end of the slider up to about the location of the section illustrated in Fig. 6. Above that section the width of the parts 12 and 14 increases relatively rapidly to form the curved sides shown best in Fig. 2. The walls 12 and 14 are rounded toward the slots 18 so that the cross section of the slider is generally oval diminishing in area from a maximum at the upper extremity of the slider. On the inner surface of each wall 12 and 14 is formed a rib 20 of a cross-section conforming with that of a groove 10. The rib 20 starts about midway between the crosspiece 16 and one slot 18, gradually moves inwardly along a curve substantially parallel to the edge defining the adjacent slot 18 and terminates slightly below the level of the section shown in Fig. 6, at which location the lower end of the rib is adjacent, but not quite at, the longitudinal center line of the respective wall 12 or 14. Substantially symmetrically disposed with respect to the rib 20 is a relatively narrow and angularly disposed projection 22 on the inner surface of each wall member 12 and 14, the projection being inclined toward the adjacent slot 18 to provide a wedge-shaped opening 24 between the projection and the adjacent inner surface of the wall member. Each rib 20 is undercut on the side facing away from the adjacent slot 18 whereby a gripping action is maintained between the wall of the tubular member 6 and the slider when the rib 20 enters a dovetail groove 10 in the member 6. The projection 22 serves to hold the tip 26 of the tubular portion 6 in the wedge-shaped opening 24 and against the adjacent wall of the slider. Thus the ribs 20 and projection 22 serve during the opening and the closing operations of the fastener to spread the tubular portions and thereby permit entry therein or exit therefrom of the cylindrical portions. When the fastener is to be closed, as by pulling upwardly on the tab 28 pivotally mounted on the wall 14 of the slider, the members, with the tubular portions thereof spread open as shown in Fig. 4, are gradually brought toward each other by the converging ribs and projections of the slider until the parts 4 pass each other at the position illustrated in Fig. 6 and enter the tubular portions 8. When the slider is moved in the opposite direction, the projections 22 enter the space between the members and hold the tips of the tubular portions against the slider walls while the ribs 20 enter the grooves 10. Divergence of the ribs and projections thus spreads the portions 8, assuring separation of the fastener members as the parts thereof sequentially assume the relative positions shown in Figs. 7, 6, 5 and 4. The gripping surfaces in the fastener shown in Figs. 4 through 7, in conjunction with the slider of the invention, comprise the outer surface of the cylindrical portions 4 and the inner surface of the tubular portions 6. These surfaces are not engaged to any substantial extent by the slider of the invention and hence no wear or deformation results from movement of the slider back and forth in opening and closing the fastener. The projections 22 engage but a small portion of the inner surfaces of the tubular portions 6.

In Figs. 8 to 13 a slider substantially like that already described but designed for operation of a fastener of specifically different configuration is illustrated. In Figs. 8 to 13 the various elements of the slider corresponding to those of the slider of Fig. 1 are indicated by the same reference numerals but with a prime affixed thereto. The slider of Figs. 8 to 13 comprises the side walls 12' and 14' interconnected at one end by the cross-piece 16' and provided with a suitable pull tab 28' for operation of the slider. Each wall 12' and 14' is provided on its inner surface with a rib 20' and an angularly disposed projection 22', the ribs and projections converging toward the longitudinal center of the walls 12' and 14' from locations substantially midway between the crosspiece 16' and the slots 18'. The particular fastener upon which the slider of Figs. 8 to 13 is shown mounted comprises strips 2' on the inner edge of each of which is a rib 4' of generally semi-cylindrical cross-section connected by a neck 30 with a part 6' of arcuate cross-section providing a channel for reception of the part 4' of the other member. Each neck 30 is cut away externally to form a dovetailed groove 10' for reception of a shoulder 26' comprising one end of the part 6' of the other member and for reception, during the opening and closing operations, of a rib 20' of the slider. Each rib 20' is slightly wider at its surface than at its base to conform in contour with the dovetailed groove 10' of the fastener. Preferably the orientation of each rib relative to its supporting wall varies progressively along its length, the direction of the side walls thereof rotating counter-clockwise from the disposition illustrated in Fig. 10 to that shown in Fig. 12 corresponding to the movement of the neck portion 30 in the closing operation. The projection 22' of the slider, by engaging the inner surface of the shoulder 26', holds the end of the part 6' against the curved wall of the slider while the rib 20', by engagement in the dovetail groove 10' formed in the neck portion 30, insures opening of the channel of the fastener to permit insertion therein of the part 4' of the other member of the slider as the parts are moved toward each other to and through the positions illustrated in Figs. 10, 11 and 12 in the closing operation. Conversely, during the opening operation, when the slider is moved downwardly as viewed in Fig. 8, the ribs 20' enter the grooves 10' and the projections 22' are brought into engagement with the inner surface of the shoulders 26' whereby, as the ribs and projections diverge, the parts sequentially assume the position shown in Figs. 13, 12, 11 and 10. The principal gripping surfaces of the fastener shown in closed position in Fig. 13 comprise the base 34 of the neck portions 30 and the inner flat surfaces 36 of the parts 4'. These surfaces are not engaged by any element of the slider during the opening and closing operations and hence no damage to the fastener results from repeated operation of the slider. Moreover, because the dovetailed grooves formed in the fastener for cooperation with the ribs of the slider serve also as interlocking elements of the fastener, the fastener presents a smooth external surface when the fastener is locked.

In each of the embodiments of the invention so far described the spreading of the tubular or female part of the fastener is effected by means of a rib on the slider entering a dovetailed groove in the fastener while an angularly disposed projection on the slider engages the tip or edge of the tubular part to hold it against the adjacent wall of the slider. If desired, in order to avoid even the small area of contact of the projection of the slider with internal surfaces of the fastener, the construction illustrated in Fig. 14 could be employed. In this embodiment of the slider of the invention, illustrated as applied to a fastener of the type shown in Figs. 4 to 7, a second dovetailed groove 38 is provided in the outer wall of each fastener adjacent the tip 26 of the tubular part 8 and each slider half is provided with a second rib 40 which enters the groove 38 and serves, together with the rib 20, to spread the tubular part of the fastener during the opening operation. Another alternative construction is illustrated in Fig. 15, wherein the ribs on the slider are replaced by dovetailed grooves 42, the fastener in this case being provided with ribs 44 for entry into the grooves 42 of the slider during the opening operation.

The invention has now been described with reference to several embodiments thereof, in each of which the slider opens the female member of a fastener by engagement primarily with the external surface thereof whereby damage and wear of the interlocking parts of the fastener are minimized.

The new slider has been illustrated operatively mounted on fasteners having interlocking members of identical construction as such fasteners are of most practical utility. Obviously the new slider is not limited to use with such type of fastener as sliders embodying the invention can be as readily designed for operation of fasteners having non-identical interlocking members as will be apparent to those skilled in the art.

The following is claimed:

1. The combination with a fastener of the type consisting of a pair of strips of flexible material formed along their edges with cooperating male and female members adapted to interlock to hold the strips in edgewise relation, of a slider for operating the fastener comprising two spaced rigid wall members interconnected at one end and with their side edges turned toward each other to define an enclosure for reception of the male and female members of the strips with the strips extending between the opposed edges of the wall members, said wall members being so shaped that the cross-section of the enclosure diminishes from a maximum adjacent the interconnected end to a minimum just sufficient to accommodate the cooperating male and female members of the fastener when interlocked, and fixed cooperating means on the interior surface of said wall members and on the outer surfaces of the fastener for spreading open the female member of the fastener when in the part of said slider between the minimum and maximum cross-section of the enclosure defined by the walls thereof, said cooperating means including ribs on some of said surfaces and complementary dovetailed grooves on the other of said surfaces.

2. The combination according to claim 1 wherein each of said strips is formed with a male member along one edge and with a female member set back therefrom and defining a channel with a restricted opening thereto, said female member along one side of said opening being connected to the male member by a neck portion provided on its outer surface with a dovetailed groove, the ribs of said cooperating means being disposed on the inner surfaces of said wall members of the slider and being adapted to fit into said dovetailed grooves in said neck portions, said cooperating means on the inner surfaces of the wall members including also projections for engaging and holding the other side of the opening in the female members in engagement with the slider walls whereby the openings are enlarged for entrance of the male members into said channels.

3. The combination according to claim 2 wherein each of said female members along the last mentioned side of the opening is formed with a shoulder adapted to fit into the dovetailed groove in the neck portion of the other strip when the fastener is closed, and said projections for holding such side against the slider are angularly disposed and engage the inner surface of said shoulders during the opening operation.

4. The combination according to claim 3 wherein said ribs and projections on the inner surface of said wall members extend from the interconnected ends of the slider walls and terminate short of the location of minimum cross-section of the enclosure defined by the walls, the lateral spacing between the projection and rib on each wall decreasing from a maximum at the interconnected ends of the slider walls to a minimum at the termination thereof.

5. A slide fastener and slider therefor, the fastener comprising a pair of identical extruded strips of synthetic plastic material each comprising along one edge a generally semi-cylindrical solid male member and a female member set back therefrom and defining a channel for reception of the male member of the other strip when the fastener is closed, the male and female members of each strip being connected by a neck portion having a dovetailed groove in the outer surface thereof adapted for reception of a reentrant rib of the female member of the other strip when the fastener is closed and the slider comprising two spaced rigid wall members interconnected at one end and with their side edges turned toward each other to define an enclosure for reception of the male and female members of the fastener, said walls being so shaped that the cross-section of the enclosure diminishes from a maximum adjacent the interconnected end of the slider walls to a minimum just sufficient to accommodate the male and female members of the fastener when interlocked, each wall member having on its inner surface a rib having non-parallel side walls conforming with the side walls of the dovetailed groove in the neck portion joining the male and female members of one strip and an angularly disposed projection adapted to engage the reentrant rib of the female member of the same strip, said rib and projection on each wall member extending from the interconnected end of the slider walls to a location short of the minimum cross-section of the enclosure defined thereby and the spacing between the rib and projection decreasing with decrease in cross-section of the enclosure, whereby movement of the slider in one direction along the strips progressively spreads the female members for release of the male members.

6. The fastener and slider therefor according to claim 5 wherein the orientation of the non-parallel side walls of each rib on the inner surfaces of said slider walls progressively shifts from one end of the rib to the other to conform with the movement of the neck portion of the fastener during opening and closing of the fastener.

LUDWIG WM. KOUTNIK.

No references cited.